United States Patent Office 2,854,476
Patented Sept. 30, 1958

2,854,476

METHOD OF SULFONATION WITH A SULFUR TRIOXIDE ADDITION PRODUCT

Joseph A. Chenicek, Bensenville, and Herman S. Bloch, Chicago, Ill., assignors to Universal Oil Products Company, Des Plaines, Ill., a corporation of Delaware No Drawing. Application April 21, 1955
Serial No. 503,016

7 Claims. (Cl. 260—505)

This invention relates to a process for introducing the sulfo radical into an organic compound subject to sulfation or sulfonation reactions, utilizing a particular sulfonating agent which is capable of effecting the resulting sulfonation in a mild form of reaction and without the undesirable formation of discolored by-products and decomposition products of the charging stock. More specifically, the invention concerns a sulfonation process effected in the presence of a sulfonating agent selected from the sulfur trioxide addition products of an alkane sulfonic acid, an alcohol sulfate ester, and an aromatic sulfonic acid, the method being particularly applicable to a process in which the sulfonic acid or sulfate ester portion of the sulfonating agent is the same as the ultimately sulfonated charging stock.

An object of this invention is to effect sulfonation reactions under mild conditions of temperature and with relatively low concentrations of the sulfonating agent in the reaction mixture, whereby relatively inorganic salt-free neutralization products of the sulfonated intermediate may be recovered from the reaction. Another object of the invention is to effect sulfonation reactions without the concomitant production of undesirable by-products and particularly discolored decomposition products of the charging stock.

In one of its embodiments the present invention relates to a process for effecting sulfation and sulfonation reactions which comprises contacting an organic compound subject to at least one of said conversions at reaction conditions sufficient to chemically introduce at least one sulfo group into said compound with a sulfonating agent selected from a sulfur trioxide addition product of an alkane sulfonic acid, a sulfur trioxide addition product of an alcohol sulfate ester, and a sulfur trioxide addition product of an aromatic hydrocarbon sulfonic acid formed prior to contacting said organic compound with said sulfonating agent.

A more specific embodiment of the invention concerns a process for effecting the sulfonation of an organic compound which comprises contacting said organic compound with a sulfonating agent comprising a sulfur trioxide addition product of the sulfonic acid derivative of the organic compound, formed by mixing said sulfonic acid derivative with a source of sulfur trioxide selected from sulfur trioxide itself and a sulfuric acid oleum in an amount at least equal, on a molar basis, to the amount of organic compound charged to the reaction mixture.

The sulfonation of organic compounds is a highly developed art which has been the subject of extensive prior investigation in order to develop a process from which substantially theoretical yields of sulfonated product may be realized and in which process the yield of by-products such as discolored decomposition products of the charging stock is minimized. The problem is one of unusual complexity when utilizing sulfuric acid-based sulfonating agents because of the formation of water during the reaction which dilutes the reaction mixture and reduces the activity of the sulfonating agent. Among other factors involved in the process is the tendency of high strength sulfonating agents to char the organic charging stock, resulting in the formation of undesirably colored reaction products. Still another problem encountered during sulfonation is the difficulty of separating the excess sulfonating agent usually employed in most sulfonation processes from the reaction mixture, thus making the production of pure sulfonated products, free of sulfate salts, a practical impossibility, unless special process techniques are employed. One of the commonly utilized sulfonating agents for sulfation as well as sulfonation reactions is an oleum, that is, fuming sulfuric acid, comprising sulfuric acid of 100% strength containing free sulfur trioxide dissolved in varying amounts therein, depending upon the oleum strength, the free sulfur trioxide being consumed during the reaction to form the sulfonated product. In the use of oleums, however, the sulfonation process usually requires the employment of a relatively large excess of total sulfonating agent as combined and free sulfur trioxide in order to complete the sulfonation reaction, so that substantial quantities of sulfuric acid and/or oleum remain in the reaction mixture following completion of the sulfonation. The presence of such excess acid in the sulfonated product results in the waste of neutralizing agents when the product is converted to the neutral sulfonate salt or the use of extensive processing equipment and procedure to separate the sulfonated material from the excess sulfonating agent.

Another sulfonating agent heretofore utilized in the sulfonation art is free sulfur trioxide in any of its various physical modifications, usually in the form of vaporized sulfur trioxide which is led into the sulfonation reaction mixture and contacted with the charging stock under carefully controlled reaction conditions. However, even though process techniques are employed which provide careful control of the reaction temperature, local high temperature zones in the reaction mixture result in polysulfonation of the charging stock and discoloration of the final product due to decomposition of a portion of the organic charging stock and resulting tar formation therefrom.

It has now been discovered that the sulfation and sulfonation of organic compounds may be effected at high reaction velocities and under readily controllable reaction conditions of temperature and concentration of sulfonating agent and without the production of discoloring decomposition products of the organic charging stock, even when charging organic materials which are normally highly sensitive to temperature increases in the presence of highly acidic sulfonating agents such as oleum or sulfur trioxide by contacting the organic charging stock with a sulfonic acid or sulfate ester addition product of sulfur trioxide as the sulfonating agent, the latter addition product yielding up its sulfur trioxide to the organic charging stock without the resultant development of high temperatures and ultimate discoloration of the product.

It has been found, in the sulfonation of organic compounds utilizing a sulfonating agent comprising free sulfur trioxide, under conditions wherein the sulfonating agent is continuously added over a period of time to the initial organic charging stock to be sulfonated, that prior to complete mono-sulfonation of the entire charging stock, a portion of the sulfonating agent continuously introduced into the reaction mixture adds to some of the sulfonic acid or sulfated material already present in the reaction mixture to form sulfur trioxide addition complexes with organic acids, thereby reducing the sulfonation velocity and the rate of heat evolution. It has also been observed that such addition products may comprise compounds containing more than one mole of sulfur trioxide per mole of organic charging stock, in addition to the mole of sulfur trioxide chemically consumed in conversion of the organic material to the sulfonic acid or sulfate ester derivative and, in fact, may contain as many as 3 moles of sulfur trioxide per mole of organic material in addition to the mole of sulfur trioxide combined with the charging stock as the sulfonic acid or sulfate ester. Such addition products which in themselves are capable of acting as sulfonating agents of the sulfonatable organic compound by transferring the sulfur trioxide from the complex to the organic compound employed as charge stock provide the essential sulfonating agents in the process of the present invention and these may be derived by recycling a portion of the sulfonated product to a succeeding sulfonation reaction mixture, therein (or prior to its introduction thereto) combining the sulfonated compound with additional sulfur trioxide in the form of an oleum or with free sulfur trioxide itself, and reacting the resulting addition product with another charge of sulfonatable organic compound at sulfonating reaction conditions. It is generally preferred, although not necessarily essential, in the above indicated method to introduce only such additional sulfur trioxide as will theoretically react with the additional charge stock to form the mono-sulfonic acid or mono-sulfated derivative product, although larger quantities may also be utilized, either as a greater molar proportion of mono-sulfur trioxide addition product of a mono-sulfonic acid, or less than a molar proportion of a poly-sulfur trioxide addition product of a mono-sulfonic acid. In any event, the addition product is supplied to the sulfonation zone in an amount sufficient to provide at least a mole-to-mole ratio of sulfur trioxide to the charged organic compound, the molar ratio of sulfur trioxide being determined on the basis of the non-sulfonic acid or non-sulfate ester portion of the addition product utilized as sulfonating agent. Utilizing the foregoing procedure, the problem of separating a heterogeneous component from the reaction mixture is obviated when the addition product is derived from the sulfonic acid or sulfate ester derivative of the charging stock, since by contacting the addition product with fresh organic charging stock, the sulfur trioxide present in the addition product is transferred to the fresh charging stock. In the use of an aromatic sulfonic acid addition product of sulfur trioxide as provided herein, the most convenient source of the sulfonic acid is the end-product of the sulfonation reaction in which such an aromatic compound is utilized as charging stock. The essence, therefore, of the present invention is the use of an SO₃-sulfonic acid or SO₃-sulfate ester addition product to effect sulfation or sulfonation reactions, the addition product conveniently being formed in a preliminary step or stage of the process flow from recycled sulfonation product and a sulfur trioxide containing reagent, the addition product thereafter being contacted with fresh organic charging stock to effect sulfation or sulfonation thereof.

The present process is applicable to any organic compound which may be contacted with the sulfur trioxide addition product of the sulfo-acid derivative of such organic compound to effect sulfation or sulfonation thereof at the conditions found to be suitable for the reagent. In specifying herein a "sulfonation process," a "sulfonatable organic compound," a "sulfonating agent," and "sulfonating conditions," it is intended that the use of the term "sulfonate" and the above derivative terms also include reactions in which sulfation is the end result of the process, as well as reactions in which sulfonation characterizes the end-product. Thus, although alcohols, when contacted with sulfur trioxide at "sulfonating conditions," are actually "sulfated" and the sulfate ester is the end-product of the process, they may also be considered as being "sulfonated" since the net effect of the reaction is the addition of a sulfo group to the charging stock to form said sulfate ester.

The organic compounds within the broad class of sulfonatable organic charging stocks utilizable herein include such compounds as the phenols and alkylphenols; alcohols of the aliphatic and alicyclic series, as well as arylalkylols; aromatic hydrocarbons such as benzene, toluene, and various alkyl derivatives thereof containing a nuclearly displaceable hydrogen atom which may be occupied by a sulfo radical, as well as the polycyclic hydrocarbons containing naphthyl, phenanthryl and anthryl nuclei; olefinic hydrocarbons such as octene, decene, etc. and cyclo-olefins or their alkyl derivatives such as cyclohexene and ethylcyclohexene; heterocyclic compounds such as thiophene, pyridine and the like; ethers and esters such as phenylmethyl ether and the fatty acid glycerides, respectively, the latter class including such compounds as the glyceride monoesters of oleic acid, linoleic acid, etc.; acids, such as benzoic acid and the aliphatic acids, particularly those containing an olefinic linkage such as linoleic acid; and other compounds containing a replaceable hydrogen atom as well as various derivatives of the above class of compounds containing non-interfering substituents, such as one or more halogen, nitro, keto, carbonyl, etc. groups.

The advantages of the present method of sulfonation are especially evident in the production of alkyl aromatic sulfonic acids which when neutralized with a suitable basic reagent, such as an alkali metal hydroxide, an amine, or an alkanolamine form highly effective detergent products because the absence of colored impurities in the sulfonate product is a particular advantage in the manufacture of detergents where color is undesirable from the standpoint of the consuming public. Suitable alkyl aromatic hydrocarbons and alkylated phenols sulfonatable by the present process to form detergents or detergent intermediates include, among others, the alkylated mono- and bicyclic aromatic hydrocarbons and phenols such as nonylbenzene, dinonylbenzene, decylbenzene, dodecylbenzene, didodecylbenzene, dodecyltoluene, pentadecylbenzene, pentadecyltoluene, amylnaphthol, amylnaphthalene, nonylnaphthalene, nonylphenol, decylphenol, and other long-chain substituted mono- and bicyclic aromatic hydrocarbons, phenols and naphthalenes.

Suitable sources of sulfur trioxide utilizable in the present process to form the present sulfonating agents comprising the sulfonic acid or sulfate ester addition complexes thereof which effect sulfonation of the organic charging stock are the mono- and poly-sulfur trioxide addition products of the alcohol sulfates and the alkane and aromatic sulfonic acids, which addition products are formed in a reaction zone either outside of the sulfonation reactor or in a preliminary reaction within the reactor by the addition of sulfur trioxide or oleum to the sulfate ester or the sulfonic acid complexing component of the sulfonating agent and the latter addition product thereafter contacted within the reactor with the organic charging stock. Although the sulfate ester or sulfonic acid utilized in preparing the sulfonating agent is preferably the product of the process, it is not necessarily so; thus an alkane sulfonic acid may be combined with sulfur trioxide to form an addition product utilizable as sulfonating agent for an aromatic or alkyl aromatic charge stock. Sulfur trioxide in any of its various physical modifications may be utilized to form the addition product including the so-called "alpha" form which is a solid, asbestos-like material melting at 62° C., and generally considered to be a sulfur trioxide polymer; the "beta" form, also a polymeric form of the sulfur trioxide monomer, melting at about 70° C., and the "gamma" form which is normally a liquid modification of sulfur trioxide melting at about 17° C. When utilized, the sulfur trioxide may be added to the sulfate ester or sulfonic acid component of the sulfonating agent in vapor form or as a liquid, and when the vaporized form is utilized, it may be carried into the reactor in which the addition product is formed as a mixture in an inert gaseous or liquid carrying agent, such as a normal paraffin or a halogenated derivative thereof. When oleum is utilized to form the addition product comprising the sulfonating agent, the oleum may contain any desired quantity of free sulfur trioxide, although preferably a high-strength oleum containing at least 25% by weight of free sulfur trioxide, up to about 70% of the latter component, is utilized to prepare the addition product sulfonating agent. In the preparation of the sulfonating agent it is generally preferred that the sulfur trioxide or oleum be combined with the sulfonic acid or sulfate ester component of the sulfonating agent prior to contact of the resulting mixture or addition product with the charging stock to be sulfonated, although in the case of certain sulfonation reactions, and with certain sulfonic acids, namely the alkane sulfonic acids, the sulfonating agent may be formed in situ during sulfonation by charging the oleum or sulfur trioxide into the reaction mixture containing the charging stock or the sulfonic acid, as desired, to provide the most advantageous process for the particular charging stock under consideration.

The component of the sulfonating agent herein referred to as a sulfur trioxide complexing agent which when combined with sulfur trioxide either in its free form or in the form of a sulfuric acid oleum containing dissolved sulfur trioxide forms the present sulfonating agent, is selected from the group consisting of the alcohol sulfate esters, the alkane sulfonic acids, and the aromatic sulfonic acids, including, particularly, the alkyl-aromatic sulfonic acids when the ultimate product is a sulfonic acid of this composition. The particular complexing agent of the above general classes to be utilized in any specific reaction will in some cases depend upon the charging stock to be sulfonated especially when it is desired to form a homogeneous sulfonation reaction mixture as the ultimate product of the process. Thus, in the case of sulfonating any particular alkyl aromatic hydrocarbon, it may be preferred to utilize as the complexing component of the sulfonating agent the sulfonic acid derivative of the alkyl aromatic hydrocarbon charging stock. In other instances, a product may be desired which comprises a mixture of the sulfonic acid employed in preparing the sulfonating agent and the sulfonic acid derivative of the charging stock, the product being a mixture in which both sulfonic acid derivatives appear. Suitable alkane sulfonic acids for this purpose include the sulfonic acid derivatives of methane, ethane, propane, butane, isobutane, n-pentane, isopentane, and homologs, generally containing not more than about 15 carbon atoms per molecule. Of the alkane sulfonic acids utilizable in the reaction, the above named lower molecular weight members are particularly preferred because these may be more readily separated from the sulfonation reaction mixture following completion of the process, if desired, one of the preferred alkane sulfonic acids for this purpose being methane sulfonic acid. Of the aromatic sulfonic acids utilizable as the sulfonic acid component of the sulfonating agent, the mono-sulfonated derivatives of benzene and its alkyl-substituted homologs are preferred, although the sulfonic acid derivative of naphthalene, phenanthrene, anthracene, and their alkyl derivatives may also be utilized in particular instances. Similarly when the product of the process is a sulfate ester of an alcohol, such as an aliphatic alcohol containing from 4 to about 20 carbon atoms, particularly an alcohol of relatively long-chain length containing from 8 to about 15 carbon atoms for the manufacture of a detersive sulfate ester therefrom, such as octanol sulfate, decanol sulfate, lauryl sulfate, etc., or a mono- or polyhydroxycycloalkane, such as cyclohexanol, inositol, hexahydrocresol, etc., or an aromatic-substituted alkanol such as phenyl pentanol, tolyloctanol, etc., it is preferred to utilize as the complexing agent of the sulfur trioxide an alcohol sulfate ester, particularly of the same structure and chemical composition as the alcohol being subjected to sulfation in the present process. Where the desired end-product is a sulfonate particularly suitable for a specific purpose, such as the alkylaryl sulfonates employed as detergents, it is desirable that the sulfur trioxide complexing component of the sulfonating agent be of the same molecular structure and composition as the alkyl aromatic hydrocarbon to be sulfonated. Thus, for example, in the manufacture of long-chain alkyl aromatic sulfonates, such as dodecyltoluene sulfonate, the complexing agent combined with the sulfur trioxide to form the sulfonating agent is likewise the same alkyl aromatic sulfonic acid as the product, such as dodecyltoluene sulfonic acid. In the production of aromatic sulfonic acids by the method herein provided, a particularly desirable method of operation and source of the sulfonic acid component of the sulfonating agent is a portion of the sulfonation reaction mixture which is diverted to an $SO_3$ premixer wherein the addition product (the sulfonating agent) is formed by mixing the portion of the sulfonation reaction mixture thus diverted with oleum or sulfur trioxide usually at temperatures not in excess of about 85° C. and preferably at from about 10° to about 50° C., and thereafter returning the resulting addition product to the sulfonation reactor wherein it is mixed and reacted with the organic compound to be sulfonated at sulfonation reaction conditions. The use of recycled sulfonic acid to form the addition product, in effect, eliminates much of the highly exothermic initial reaction which usually occurs during ordinary sulfonation when the sulfur trioxide initially contacts the raw charging stock to form the sulfonic acid or sulfate ester derivative. In accordance with the method of the present invention, the sulfur trioxide added to the reaction mixture containing recycled sulfonic acid or sulfate ester, depending upon the charging stocks to the process combines with the sulfonic acid or sulfate ester therein to form the mono- or polysulfur trioxide addition product, the heats of solution, of complex formation and of sulfonation being generated separately and more gradually, so that there is a lower temperature of conversion than occurs with the direct addition of sulfur trioxide to the organic charging stock. By initially mixing the sulfonic acid or sulfate ester recycled from the previous reaction in a quantity at least 50 mole percent of the organic compound charged to the reaction with from about 0.5 to about 3.0 molar proportions of sulfur trioxide, the sulfur trioxide added to the reaction combines with the recycle to form the addition product (a low temperature reaction) and thereafter, as the fresh charge of organic compound is added to the mixture, the addition complex tends to yield up free sulfur trioxide to the organic charge stock until a uniform product, principally sulfonic acid, is formed, the reaction taking place generally over a longer period of time, at a lower temperature and without the customary decomposition reactions and the consequent production of discolored products.

It is generally preferred in a batch type sulfonation process in which the charging stock and sulfonating agent ($SO_3$ addition product) are introduced together as a single charge into the sulfonation reactor and the sulfonation thereafter allowed to proceed to completion before withdrawal of product or charging additional starting material to employ at least 50%, up to about 200% by weight of the charging stock, of previously formed sulfur trioxide-sulfonic acid or sulfate ester addition product and preferably between 75 and about 150% by weight thereof, depending upon the number of moles of sulfur trioxide combined with the complexing component of the sulfonating agent. In a continuous type of operation in which the sulfur trioxide and a sulfonic acid or sulfate ester are introduced continuously into a premixing reactor and the addition product is continuously withdrawn from the premixer and mixed with the organic charging stock in a sulfonation reactor, a portion of the reaction mixture being recycled to provide the sulfonic acid or sulfate ester component of the sulfonating agent, it is generally preferred that the reaction mixture be so constituted as to contain from about 30 to about 50% by weight of the sulfate ester or sulfonic acid complexing component of the sulfonating agent, based upon the charge to be sulfonated. Where the charge stock does not yield the same sulfonated product as the complexing component of the sulfonating agent, it is particularly preferred in selecting the complexing component to employ a low molecular weight sulfonic acid or lower alcohol sulfate ester and to separate the same from the effluent product of the sulfonation process for recycling to the latter process. This type of separation may be effected by diluting the effluent product with a diluent in which the low molecular weight complexing component is substantially insoluble and in which the product readily dissolves. Diluents particularly preferred for this purpose are the paraffinic hydrocarbons and naphthenes or their halogenated analogs, such as butane, n-pentane, n-hexane, cyclohexane, and heptane, chloroform, carbon tetrachloride, trichloroethylene, trichloropropane, etc., preferably a diluent having a boiling point which permits the same to be readily separated by distillation from the sulfonated product with which it is combined. In many instances the addition of a small amount of water to the sulfonation reaction product containing the diluent, usually an amount not in excess of about 20% by weight of the sulfonating agent present in the reaction mixture at any particular instant, enhances then separation of the complexing component portion of the sulfonating agent therefrom.

Sulfonation of organic compounds in the presence of a sulfur trioxide-sulfonic acid or sulfur trioxide-sulfate ester addition product by the means herein provided is generally effected at temperatures of from about 0° to about 70° C., preferably at from about 10° to about 50° C. and at pressures sufficient to maintain the reaction mixture in substantially liquid phase, the preferred temperature for any particular charge stock depending upon the composition of the organic compound and the number of moles of sulfur trioxide combined with each mole of complexing component in the addition product, lower temperatures within the above range being generally preferred for sulfation of alcohols and when utilizing a di- or trisulfur trioxide addition product, while higher temperatures are preferred for sulfonation of aliphatic and aromatic hydrocarbons and when employing a monosulfur trioxide addition product.

The present invention is further illustrated with respect to several of its specific embodiments in the following examples which are provided merely for illustrative purposes with no intention of limiting the scope of the invention necessarily in accordance therewith.

*Example I*

Ethylbenzene is sulfonated by the direct addition of sulfur trioxide vapor mixed with n-butane gas (20% by weight of sulfur trioxide) to a stirred reaction mixture containing ethylbenzene. The sulfonating agent is prepared by bubbling n-butane vapor through a flask of liquid sulfur trioxide (commercial gamma sulfur trioxide supplied under the trade-name "Sulfan") maintained at 30° C., the mixture of diluent and $SO_3$ vapors from the flask being mixed with a separate side stream of vaporized n-butane to produce a 20% by weight sulfur trioxide mixture. The resulting gaseous sulfonating agent is bubbled into a stirred vessel containing ethylbenzene at a rate such that the temperature of the resulting sulfonation mixture is maintained at from about 5° to about 10° C. with the aid of a cooling bath consisting of a mixture of salt and ice surrounding the sulfonation flask. Upon the initial addition of sulfonating agent to the fresh charge of ethylbenzene the mixture is quite fluid and the reaction is highly exothermic, necessitating a relatively slow addition rate of the sulfur trioxide to the reaction mixture in order to maintain the latter at a temperature within the above desired range. Following the addition of 0.5 mole of sulfur trioxide per mole of ethylbenzene, the rate of heat liberation gradually decreases and the viscosity of the mixture increases rapidly. A sample of the reaction mixture to which 50 mole percent of sulfur trioxide has been added, diluted with 5 volumes of n-pentane and extracted with an aqueous solution containing 3 stoichiometric equivalents of sodium hydroxide based on the theoretical acid content of the sample indicates that approximately 43% of the ethylbenzene charge stock has been sulfonated, the unsulfonated portion entering the n-pentane layer. After addition of 1 mole of sulfur trioxide per mole of ethylbenzene initially charged to the reaction mixture a similar sampling procedure indicates that approximately 85% of the ethylbenzene has undergone sulfonation. The rate of heat liberation at this stage of the sulfonation is substantially less than upon the initial contact of sulfur trioxide with the ethylbenzene and the temperature of the reaction mixture may be increased to 25° C. without resulting in further discoloration of the reaction mixture by charring. At the latter temperature the mixture is relatively fluid and may be stirred more readily to effect the desired mixing. The reaction mixture continues to absorb additional sulfur trioxide and after absorption of 1.3 moles of sulfur trioxide per mole of ethylbenzene initially charged, as determined by the increase in weight of the reaction mixture, a sample of the mixture indicates that substantially complete mono-sulfonation has occurred. The mixture continues to gain in weight as the sulfonating agent is added thereto until it has increased the initial weight of ethylbenzene approximately 2.5-fold. Neutralization of a sample of the product with aqueous caustic to a pH of 7 consumes approximately 3 moles of sodium hydroxide per mole of ethylbenzene present and analysis of the ethanol extract of the evaporated neutralization product (the extraction being effected in a Soxhlet extractor followed by evaporation of the ethanol extraction to dryness) indicates that the product contains no recoverable amount of unsulfonated ethylbenzene.

The above results indicate that although only mono-sulfonation is obtained in the reaction, the sulfonated product contains substantially more than 1 mole of sulfur trioxide per mole of ethylbenzene combined therewith and that the formation of the addition product occurs before complete mono-sulfonation is obtained in the reaction. On the basis of the quantity of sulfur trioxide absorbed and retained by the ethylbenzene, the product consists of the mono-sulfur trioxide addition product of ethylbenzene sulfonic acid.

The product of the above sulfonation reaction containing the addition product of sulfur trioxide with ethylbenzene sulfonic acid is mixed with an additional quantity of unsulfonated ethylbenzene in the ratio of 1 mole of ethylbenzene for each 1.5 moles of addition product at a temperature of about 30° C., the addition product being rapidly stirred into the ethylbenzene. A sample of the product when neutralized with caustic soda and analyzed for unreacted ethylbenzene contains none of the latter unreacted starting material, indicating that substantially complete mono-sulfonation has occurred. The dried sodium sulfonate salt of the ethylbenzene is a light cream colored product which is completely soluble in water.

The reaction may also be effected continuously by recycling a portion of the sulfonation reaction mixture as a continuous stream to a premixing zone preceding the sulfonation reactor wherein the sulfonic acid contained in the recycle stream is mixed with the required quantity of sulfur trioxide to form the sulfur trioxide addition product of ethylbenzene sulfonic acid, the latter addition product being thereafter continuously introduced into the stirred sulfonation reactor with a one-half molar proportion of ethylbenzene, also continuously added to the reactor. In the latter continuous method of sulfonation a small percentage of the ethylbenzene may remain unsulfonated, but this may be removed, also on a continuous basis by introducing liquid n-butane into the sulfonation reactor, together with the charging stock and separating a n-butane extract from the reaction mixture after removal from the sulfonation zone. Evaporation of the n-butane solvent leaves a residue comprising unvaporized ethylbenzene which may be added to the charging stock for recycling to the sulfonation zone.

*Example II*

In a continuous process in which a sulfuric acid oleum addition product of a sulfonic acid is utilized as sulfonating agent, substantially complete mono-sulfonation is obtained when the quantity of sulfur trioxide addition product of the ethylbenzene sulfonic acid is approximately equal, on a molar basis, to the amount of ethylbenzene charged. Thus, a mixture containing the sulfur trioxide-ethylbenzene sulfonic acid addition product formed as in Example I from 60% oleum (60% indicating the weight concentration of free sulfur trioxide in the oleum, the weight of sulfur trioxide in the added oleum also determining the moles of $SO_3$ supplied) is added to a molar amount of ethylbenzene maintained at approximately 25° C. contained in a cooled sulfonation reactor equipped with a motor-driven stirrer, the mixture being stirred as the sulfonating agent is added to the ethylbenzene. Although the reaction is exothermic, the heat is evolved gradually and the reaction is substantially slower than the reaction of ethylbenzene with 60% oleum in the absence of the ethylbenzene sulfonic acid addition product. After stirring the reaction mixture for 2 hours at the above temperature, substantially all of the ethylbenzene is reacted, as indicated by the absence of free ethylbenzene in a liquid n-butane extract of the reaction mixture. Neutralization of the resulting reaction product with aqueous caustic produces a dried sulfonate salt of light cream color.

As in the preceding run, which utilized sulfur trioxide vapor as the source of sulfur trioxide, the ethylbenzene sulfonic acid component of the sulfonating agent may be derived from the sulfonation reaction mixture by recycling the latter, together with added oleum, to the sulfonation reactor. The product of the reaction, again, is substantially completely mono-sulfonated.

*Example III*

A sulfonating agent is prepared by combining 0.75 mole of ethane sulfonic acid and 1.50 moles of sulfur trioxide, the latter being added to the sulfonic acid by bubbling a sulfur trioxide vapor-n-butane mixture into the ethane sulfonic acid at 30° C. until the ethane sulfonic acid absorbs an amount of $SO_3$ equivalent to approximately the desired 1.50 moles of sulfur trioxide. This mixture is then stirred into one mole of dodecylbenzene maintained at about 25° C. over a period of about 20 minutes, the reaction flask being surrounded by a circulating water bath maintained at approximately 25° C. A thermometer inserted into the reaction mixture indicates that the reaction mixture does not increase in temperature more than 5° C. during the 20 minute period of sulfonation. The reaction mixture is stirred for an additional 2 hours at 25°–30° C. and after this period, extraction of the reaction mixture with 5 volumes of liquid n-butane indicates that substantially complete mono-sulfonation has occurred with less than 0.5% of the original dodecylbenzene being recovered in the n-butane extract. To the resulting reaction mixture is added 2 volumes of chloroform which is maintained at 25° C. until the mixture has completely stratified. A phase comprising approximately 85% of the ethane sulfonic acid originally charged separates from the chloroform-dodecylbenzene sulfonic acid phase and is separated therefrom by decantation.

The chloroform solution is stirred into an aqueous caustic solution containing a molar equivalent of sodium hydroxide to extract the dodecylbenzene sulfonic acid therefrom, the chloroform layer being withdrawn by decantation. Evaporation of the aqueous caustic extract to dryness on a stream bath deposits approximately one mole of sodium dodecylbenzene sulfonate which is light cream colored and dissolves completely in water.

We claim as our invention:

1. In the sulfonation of a sulfonatable organic compound with sulfur trioxide, the improvement which comprises supplying the sulfur trioxide to the sulfonating reaction in the form of an addition product thereof with a complexing agent selected from the group consisting of an alcohol sulfate ester, an alkane sulfonic acid and an aromatic hydrocarbon sulfonic acid, the amount of said addition product being sufficient to furnish all of the sulfur trixoide required for the sulfonation of said organic compound.

2. The improvement of claim 1 further characterized in that said complexing agent comprises a portion of the sulfonation product of the process.

3. In the sulfonation of a benzene hydrocarbon with sulfur trioxide, the improvement which comprises supplying the sulfur trioxide to the sulfonating reaction in the form of an addition product thereof with a benzene hydrocarbon sulfonic acid, the amount of said addition product being sufficient to furnish all of the sulfur trioxide required for the sulfonation of said benzene hydrocarbon.

4. The improvement of claim 1 further characterized in that said complexing agent is a benzene hydrocarbon sulfonic acid.

5. The improvement of claim 1 further characterized in that the molar ratio of sulfur trioxide combined with said complexing agent is from about 0.5 to about 3.

6. The improvement of claim 1 further characterized in that said complexing agent is a low molecular weight alkane sulfonic acid.

7. The improvement of claim 1 further characterized in that the complexing agent is a sulfate ester containing from about 8 to about 15 carbon atoms.

References Cited in the file of this patent

UNITED STATES PATENTS

| | | |
|---|---|---|
| 2,573,675 | Bloch et al. | Nov. 6, 1951 |
| 2,616,936 | Mammen et al. | Nov. 4, 1952 |
| 2,693,479 | Ross | Nov. 2, 1954 |